US006983476B2

(12) United States Patent
Tsai et al.

(10) Patent No.: US 6,983,476 B2
(45) Date of Patent: Jan. 3, 2006

(54) REWRITABLE OPTICAL RECORDING MEDIUM WITH ZNO NEAR-FIELD OPTICAL INTERACTION LAYER

(75) Inventors: Din-Ping Tsai, Taipei (TW); Yu-Hsuan Lin, Taipei (TW); Wei-Chih Lin, Taipei (TW); Hsun-Hao Chang, Taipei (TW)

(73) Assignee: National Taiwan University, Taipei (TW)

( * ) Notice: Subject to any disclaimer, the term of this patent is extended or adjusted under 35 U.S.C. 154(b) by 363 days.

(21) Appl. No.: 10/337,775

(22) Filed: Jan. 8, 2003

(65) Prior Publication Data

US 2003/0218969 A1 Nov. 27, 2003

(30) Foreign Application Priority Data

May 27, 2002 (TW) ...................................... 91207654 U

(51) Int. Cl.
*G11B 7/24* (2006.01)

(52) U.S. Cl. ........................................................ 720/718

(58) Field of Classification Search ................. 705/718; 369/288, 283, 286; 430/270, 270.13, 945; 428/64.4

See application file for complete search history.

(56) References Cited

U.S. PATENT DOCUMENTS 5,125,750 A 6/1992 Corle et al. ................. 359/819
5,718,961 A * 2/1998 Hong ......................... 428/64.1
5,761,179 A * 6/1998 Iwasaki et al. .......... 369/59.11
5,848,043 A * 12/1998 Takada et al. ............. 369/53.3
6,226,258 B1 5/2001 Tominaga et al. .......... 369/283
6,242,157 B1 6/2001 Tominaga et al. ..... 430/270.13
6,319,582 B1 11/2001 Tominaga et al. ......... 428/64.1
6,340,813 B1 1/2002 Tominaga et al. .......... 250/216
2001/0003641 A1 * 6/2001 Kunitomo et al. ..... 430/270.13

* cited by examiner

*Primary Examiner*—A. J. Heinz
*Assistant Examiner*—Mark Blouin
(74) *Attorney, Agent, or Firm*—Troxell Law Office, PLLC

(57) ABSTRACT

This invention is a rewritable near-field optical medium using a zinc oxide nano-structured thin film as the localized near-field interaction layer. This rewritable near-field optical medium is a multilayered body at least comprising: (a) a substrate of transparent material; (b) a first protective and spacer layer formed on one surface of the substrate, which is made of transparent dielectric material; (c) a zinc oxide nano-structured thin film which is capable of causing localized near-field optical interactions; (d) a second protective and spacer layer formed on the localized near-field optical interaction layer, which is also made of transparent dielectric material; (e) a rewritable recording layer; (f) a third protective and spacer layer formed on the rewritable recording layer, which is also made of transparent dielectric material. Ultrahigh density near-field optical recording can be achieved by the localized near-field optical interactions of the zinc oxide nanostructured thin film that is in the near-field region of the rewritable recording layer.

20 Claims, 4 Drawing Sheets

REWRITABLE OPTICAL RECORDING MEDIUM WITH ZNO NEAR-FIELD OPTICAL INTERACTION LAYER

FIELD OF THE INVENTION

This invention is a rewritable near-field optical disk using a zinc-oxide (ZnO) nano-structured thin film as the localized near-field optical interaction layer. Ultrahigh density near-field recording can be achieved by this read-only optical disk.

BACKGROUND OF THE INVENTION

The conventional optical disks are practical and popular in optical recording media with a fine storage quality and high stability, which have been widely utilized for data storage and multimedia entertainment. Accompanying with the advanced technological development, a mass amount of disks are produced into lots of categories and features, mainly divided into three types, read only, write once, and rewritable. The read-only type disks are CD-DA, CD-ROM, CD-I, VCD, DVD, DVD-ROM, DVD-Video, etc. The write-once type disks are CD-R, DVD-R and so on. The rewritable disks are MD, MO, PD, CD-RW, DVD-RW, CD-RAM, etc.

The recorded contents are coded to digital signals and transfer to the optical signals which are then subsequently focused and delivered by the pick-up head optical lens onto the rewritable recording thin film layer to generate the written bits for the written process of the rewritable optical disk. Because the written bits on the recording thin film layer are erasable and rewritable, the rewritable optical disk can be recorded many times. Generally, the differences between the erasing and writing process are the incident laser power and the duration of the laser pulse. The readout of the rewritable optical disk is the collection of the optical signals from the written bits on the rewritable recording thin film layer by the focusing pick-up head optical lens, and then subsequently transfers the optical signals to the digital contents.

Currently, the distance between the optical disk and the pick-up head lens is much larger than the wavelength used by the optical disks and disk drivers commercially available. That means the optical recording technology is using far-field optics alone. It is unavoidable that an optical interference or diffraction phenomena will occur due to the wave characteristics of optics, and the spatial resolution of recording and reading is limited by the optical diffraction limit (i.e. $1.22\lambda/(2n \sin \theta)$, wherein $\lambda$ is the wavelength of light used, n is the refractive index of the medium, and $\theta$ is the half angle of the aperture), In the past, the following methods were used to increase the recording capacity of the conventional optical disks:

(1) A more efficient coding and decoding technique.
(2) A small size of all the pits and their pitches of the tracks on optical disks.
(3) Using the shorter wavelength of a light source.
(4) Increase of the numerical aperture value of the objective lens.
(5) Using a volumetric technology such as multi-layer recording, holography, etc.

Aforementioned methods are only the optimizations under the diffraction limit of far-field optics. A most basic way to improve the recording density and break through the diffraction limit is the use of the near-field optical technology. Eric Betzig of the Bell Laboratory, USA, first demonstrated the near-field optical recording using an optical fiber probe in 1992. His results overcome the optical diffraction limit. The recorded density was effectively improved. An Optical fiber prove with an aperture of several tens of nanometers at the fiber end is used for the near-field optical recording and readout on a multi-layered platinum (Pt) and cobalt (Co) magneto-optical medium layer in his work. By controlling the fiber probe in a very close distance which is much smaller than the wavelength used for the experiments, an ultrahigh density recording of 45 Giga-bits per square inch was achieved. However, there are several difficulties and disadvantages of using the near-field fiber probe such as the precise control of the distance between the fiber probe and surface of the recording medium (about a few nanometers), the fragility of the fiber probe, low scanning speed, low optical throughput and high optical attenuation (around $10^{-6}$ to $10^{-3}$), and complexity of the fabrication of the nanometer-scale aperture at the end of the fiber probe.

On the other hand, an issued U.S. Pat. No. 5,125,750, disclosed a solid immersion lens (SIL) prototype that was possible and practical to implement the near-field disk drivers by G. S. Kino and his research team on the Stanford University, USA. The method of said patent has a reading/writing head which made of the semi-spherical and the super semi-spherical transparent solids—which have a high refection index, n,—for effective shrinking the reading/writing marks. Thus, said method of optical head could be speeding a reading/writing rate, then by adopting the present disk technology to directly develop into the high density optical recording of near-field disk drivers. In 1995, a company named TeraStor in San Jose, Calif., USA adopted this patented technological SIL as a "flying" reading/writing pick-up head to the near-field optical recording disk drivers, and tried to produce a first optical disk drive in high density optical recording. This high-speed "flying" reading/writing pick-up head had to be effectively controlled under a near-field range. The technical problems of the reliability of the flying pick-up head in the optical near field finally hindered the further developments of the high density near-field optical disk driver.

The issued U.S. Pat. Nos. 6,226,258; 6,242,157; 6,319,582 and 6,340,813, in which Dr. Junji Tominaga disclosed a design, by adding two nano-film layers (SiN in 20 nm and Sb in 15 nm) onto the normally used phase-change optical disk to replace the near-field effect of an optical fiber probe of the near-field scanning microscope, and to carry out the read/write actions beyond the optical diffraction limit.

Aforesaid design shows a usage of alternating of thin-film structure on the disks to reach a near-field ultrahigh density of optical recording. Then accompanying with an improved structure of the film layer of said disks, said structure improved the two main structures of said film layer from a first category (Sb and $SiN_{x1}$,) to a second category ($AgO_x$ and $ZnS—SiO_2$). However, said film layer of said two categories, which generated a localized near-field optical effect of Sb and $AgO_x$ nano-film layer, of their substances/materials are unstable, and can easily lose the properties of localization due to high temperature and the absorption of water vapor.

The present invention is a rewritable near-field optical disk with a zinc-oxide (ZnO) nano-structured thin film and a spacer layer such as $ZnS—SiO_2$ on the rewritable recording layer. The ultrahigh density rewritable near-field recording disk can be effectively achieved by this invention.

In summary, aforementioned conventional far-field optical method appears that the short-wavelength of light-source is costly, and the reading/writing spots of a conventional disk driver have an optical diffraction limit, so only the near-field optics with no diffraction limits can effectively improve the recording spot size below the diffraction limits. Additionally, the near-field optical technique of aforesaid near-field scanning probe and SIL near-field optical disk drive have lots of difficulties, which makes said near-field optical disk become an appropriate choice for near-field optical recording. It is known that Sb and $AgO_x$ are unstable substances/materials for manufacturing disks, so this invention uses more stable and better localized near-field optical effect of zinc-oxide (ZnO) nano-structured thin film(s) to produce the rewritable zinc-oxide (ZnO) near-field optical disks. This invention is to use the stability and the localization effect of the zinc-oxide (ZnO) nano-structured thin film along with a near-field spacer layer of ZnS—$SiO_2$ to achieve an ultrahigh density rewritable near-field optical disk. The localized near-field optical effects can be happened between the zinc-oxide (ZnO) nano-structured thin film and rewritable recording layer on a transparent substrate in near-field range. There is no diffraction limit for the rewritable optical storage using this method.

SUMMARY OF THE INVENTION

This invention is related to a zinc-oxide (ZnO) nano-structured thin film used in rewritable near-field optical disks. Because the near-field optical interactions have no diffraction limits, this rewritable near-field optical disk is capable of obtaining ultrahigh recording density and capacity.

The zinc-oxide (ZnO) nano-structured thin film is fabricated along with a near-field spacer layer of ZnS—$SiO_2$ on a rewritable recording layer. The localized near-field optical interactions between zinc-oxide (ZnO) nano-structured thin film and the rewritable recording layer enable the rewritable recorded marks smaller than the optical diffraction limit to be written, read, and erased in ultrahigh spatial resolution.

Another object of this invention is to provide various rang of optimal thickness for said nano-structured thin film layers for a better localized optical effect or interaction under a stable operating circumstance.

Another object of this invention is to provide a structure of multilayered thin film with metallic or glass, or the materials for supporting a process of localized near-field optical effect in the process of erasing, write-in or readout of the rewritable near-field optical disk.

BRIEF DESCRIPTION OF THE DRAWINGS

For a better understanding of the present invention as well as other objects and features, reference is made to disclose this invention taken in conjunction with drawings as follows.

DESCRIPTION OF THE PREFERRED EMBODIMENTS

The following descriptions of the preferred embodiments are provided to understand the features and the structures of the present invention.

Figure 1:
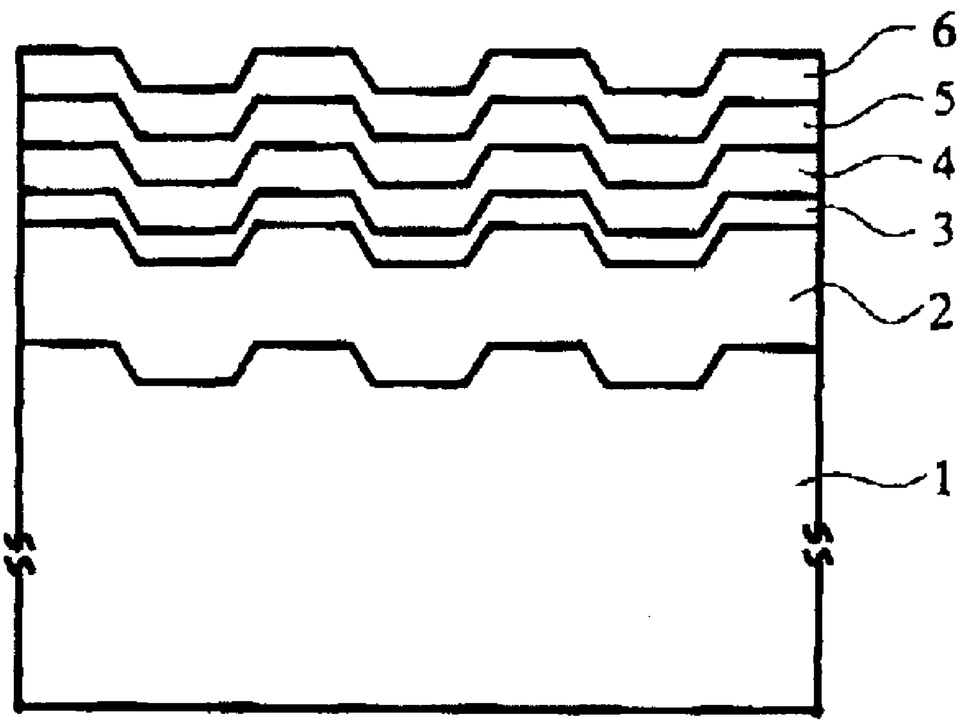
FIG. 1 is a structure diagram showing the rewritable optical recording medium with ZnO near-field optical interaction layer for disks in this invention.

FIG. 1 is a structure diagram showing the rewritable optical recording medium with zinc-oxide (ZnO) near-field optical interaction layer for disks according to present invention. The structure of the rewritable optical recording medium comprises a transparent substrate 1 and a plurality of thin film layers formed on said a transparent substrate 1. The plurality of thin films consist of a first transparent dielectric thin film layer 2, a zin-coxide (ZnO) nano-structured thin film layer 3 that is capable of causing localized near-field optical effect, a second transparent dielectric thin film layer 4, a rewritable recording layer 5, and a third transparent dielectric thin film layer 6. The transparent substrate 1 is made of $SiO_2$ glass materials, or doped $SiO_2$ glass materials with Sodium(Na), Lithium(Li), Calcium(Ca), Potassium(K), Aluminum(Al), Germanium (Ge), Boron(B), etc. in various ratio, or transparent polymerized materials which comprise polycarbonate, or epoxy resin, etc. The first transparent dielectric thin film layer 2, the second transparent dielectric thin film layer 4 and the third transparent dielectric thin film layer 6 are selected from the group of the transparent dielectric materials consisting of ZnS—$SiO_2$, ZnS—$SiO_x$, $SiO_2$, $SiO_x$, or $SiN_x$. The first transparent dielectric thin film layer 2, the second transparent dielectric thin film layer 4 and said third transparent dielectric thin film layer 6 are single or multiple layer structure. The optimal thickness of said first transparent dielectric thin film layer 2 is in the range of about 50 nm to 300 nm. The optimal thickness of said second transparent dielectric thin film layer 4 is in the range of about 5 nm to 100 nm. The optimal thickness of said third transparent dielectric thin film layer 6 is in the range of about 5 nm to 100 nm. The zinc-oxide (ZnO) nano-structured thin film layer 3 that is capable of causing localized near-field optical effect is made of compound of zinc-oxide (ZnO), or the compositions of zinc-oxide and zinc. The optimal thickness of said zinc-oxide (ZnO) nano-structured thin film layer 3 that is capable of causing localized near-field optical effect is in the range of about 5 nm to 100 nm. The rewritable recording thin film layer 5 is a rewritable material of photo-thermal effect or magneto-optical effect. The material of the rewritable recording thin film layer 5 is selected from $Ge_xSb_yTe_z$, $In_xSb_yTe_z$, $Ag_wIn_xSb_yTe_z$, $Fe_xTb_yCo_z$, $Gd_xTb_yFe_z$ or $Co_xPt_y$, doping with some elements such as Copper (Cu), Zinc(Zn), Arsenic(As), Tin(Sn), Gold(Au), Mercury (Hg), Thallium(Tl), Lead(Pb), Bismuth(Bi), Gallium(Ga), Germanium(Ge), Cadmium(Cd), Indium(In), Antimony (Sb), Silver(Ag), Selenium(Se), and Tellurium(Te). The rewritable recording thin film layer 5 is a single or multiple layer structure. The optimal thickness of the rewritable recording thin film layer 5 is in the range of about 5 nm to 100 nm.

Figure 2:
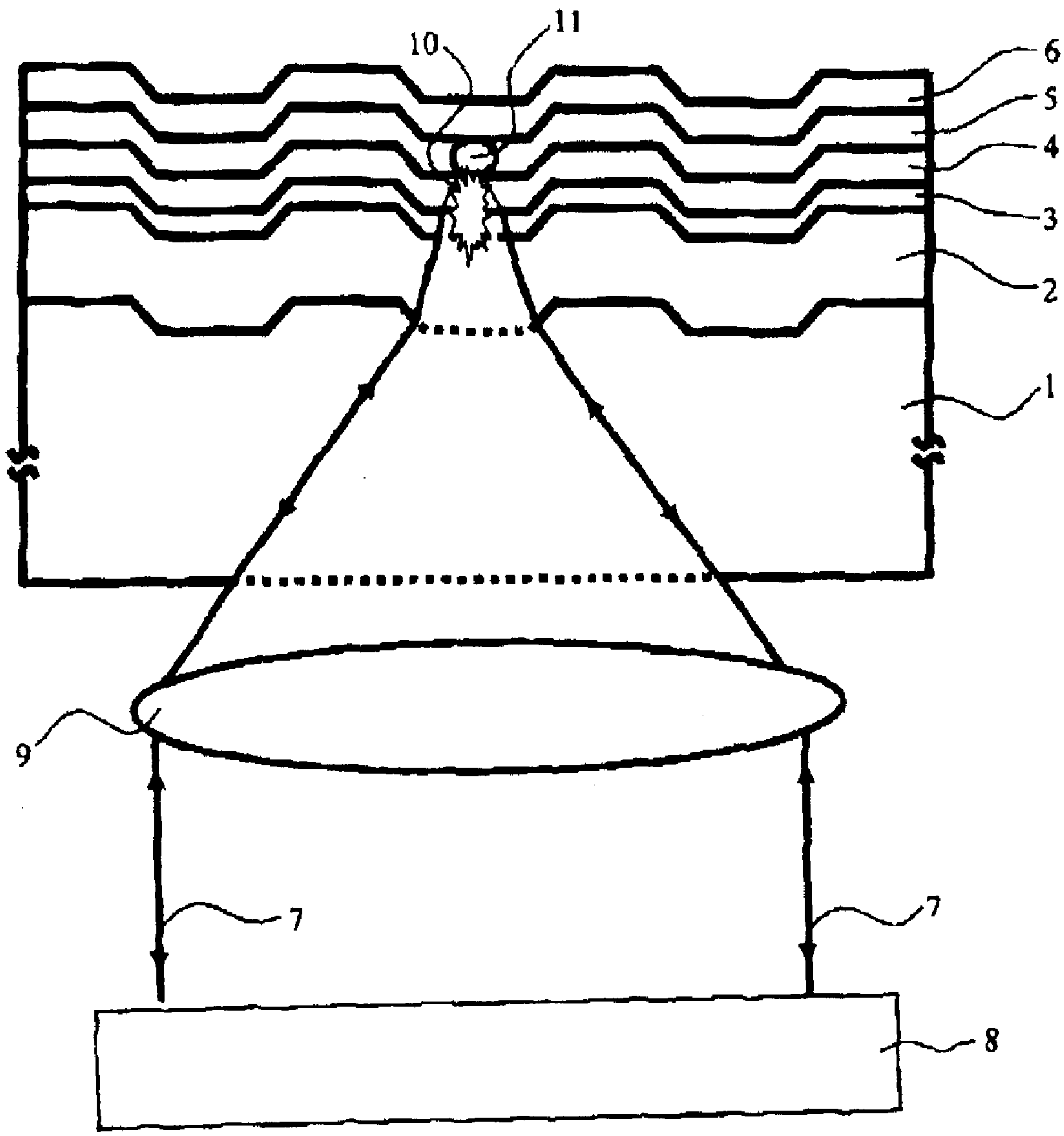
FIG. 2 shows the working principle of write-in, readout, and erasing marks of a rewritable optical recording medium with ZnO near-field optical interaction layer for disks in this invention.

FIG. 2 shows the working principle of the write-in, readout, and erasing marks of a rewritable optical recording medium with ZnO near-field optical interaction layer for disks according to the present invention. The light beams (in/out) 7 of light source via the optical lens 9 of a pick-up head of disk driver 8 penetrate the transparent substrate 1, and the first transparent dielectric thin film layer 2 thereto focusing on zinc-oxide (ZnO) nano-structured thin film layer 3 that is capable of causing localized near-field optical effect. The localized near-field optical interaction beyond diffraction limit 10 generated by the interaction of the focused laser and the rewritable recording layer 5 can write and read the storage data of said recorded marks with the size below the optical diffraction limit 11.

Therefore, accompanying with a rotating disk and a high-speed write-in and readout scanning pick-up optical head of a disk driver, the writing and reading action of ultrahigh density rewritable optical recording medium can be carried out. The first transparent dielectric thin film layer 2 and the second transparent dielectric thin-film layer 4 can protect and stabilize the zinc-oxide (ZnO) nano-structured thin film layer 3 that is capable of causing localized near-field optical effect, and said second transparent dielectric thin-film layer 4 maintains a fixed near-field distance between said rewritable recording layer 5 and said zinc-oxide (ZnO) nano-structured thin film layer 3 that is capable of causing localized near-field optical effect. The third transparent dielectric thin film layer 6 can protect and stabilize the structure of the rewritable recording layer 5 to extend its lifetime.

Figure 3:
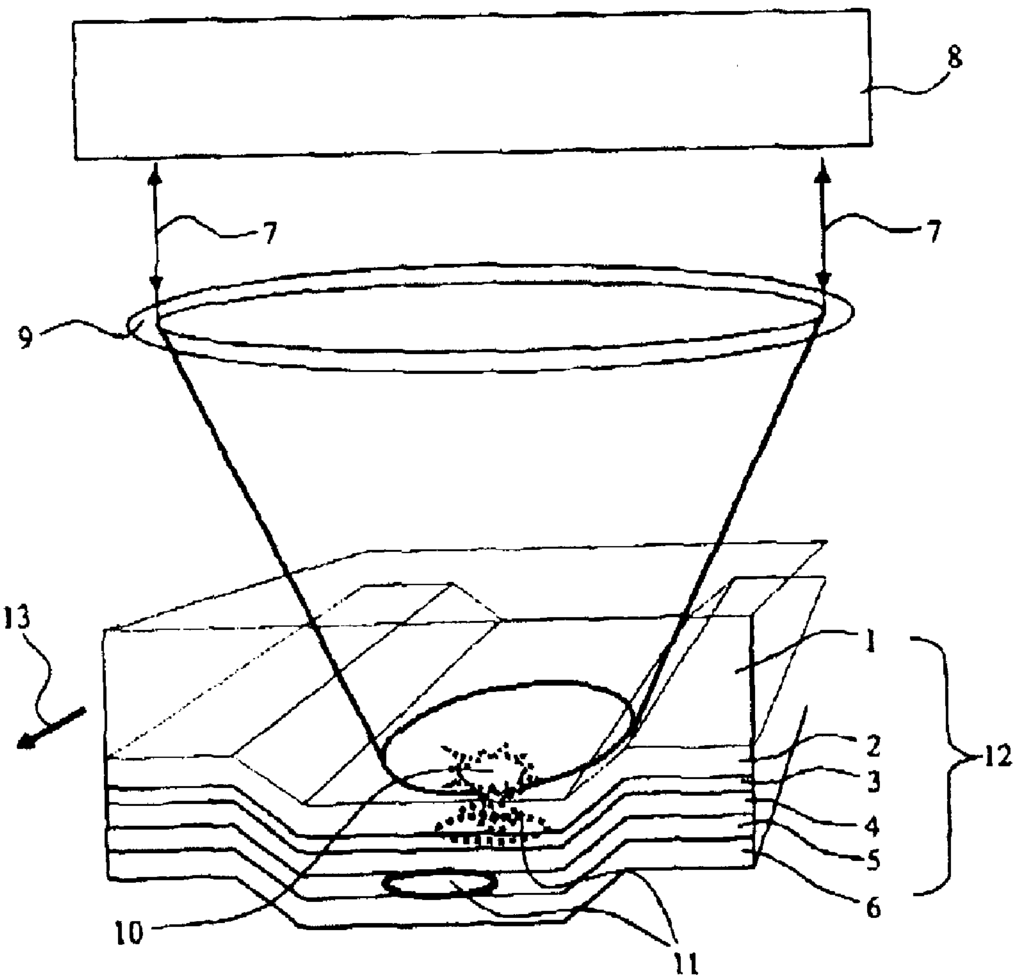
FIG. 3 is a schematic illustration showing one preferred embodiment of the pick-up head and optical lens of a disk driver in coordination with a rewritable optical recording medium with ZnO near-field optical interaction layer for disks in this invention.

As shown in FIG. 3, it is a preferred embodiment of a rewritable zinc-oxide (ZnO) near-field optical disk 12 and pick-up head of disk driver 8. The rewritable zinc-oxide (ZnO) near-field optical disk 12 rotates in the rotation direction of optical disk 13, the tracking and focusing mechanism of the disk driver maintains the pick-up head optical lens 9 and pick-up head of disk driver 8 at the proper position to focus on the rewritable zinc-oxide (ZnO) near-field optical disk 12. The localized near-field optical interaction beyond diffraction limit 10 coupled between the zinc-oxide (ZnO) nano-structured thin film layer 3 and rewritable recording layer 5 can successfully write and read said the recorded marks 11 with the size below the optical diffraction limit.

Figure 4:
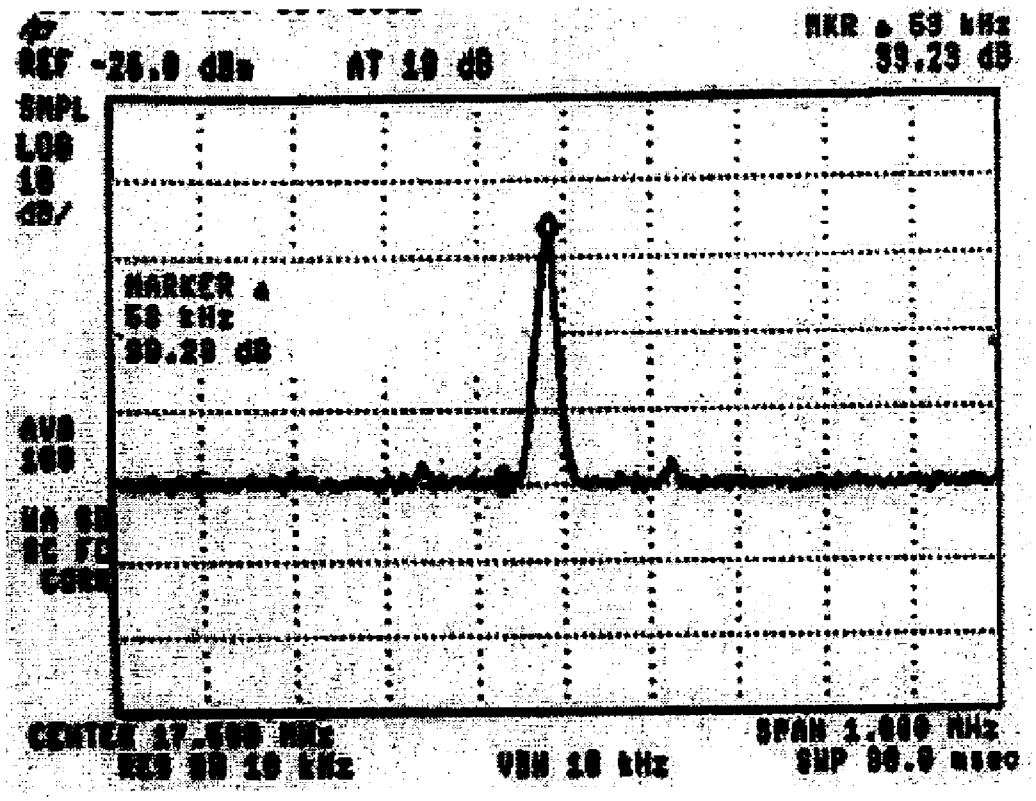
FIG. 4 shows the readout results of the recorded marks of the rewritable optical disk with zinc-oxide (ZnO) near-field optical interaction layer by using an optical disk tester.

One of the experimental readout results of the rewritable zinc-oxide (ZnO) near-field optical disk 12 is displayed in FIG. 4. A disk tester (manufactured by Pulstec Industrial Co., Ltd., Model DDU-1000) with the wavelength of light source at 673 nm and numerical aperture (NA) of the pick-up head lens at 0.6 is used to write-in and readout the pre-recorded 100 nm marks on a rewritable zinc-oxide (ZnO) near-field optical disk 12 in this invention. The disk is rotated in a constant liner velocity at 3.5 m/s, the write-in laser power out of the pick-up head is 14 mW, and the readout laser power out of the pick-up head is 5 mW. The readout results measured by a spectrum analyzer are shown in FIG. 4. The measured carrier-to-noise (CNR) value of the recorded 100 nm marks is 33.23 dB. It is dearly evident that rewritable zinc-oxide (ZnO) near-field optical disk 12 described in this invention is capable of write-in and readout marks below the optical diffraction limit.

While this invention has been described in conjunction with particular embodiments, it is evident that alternatives, modifications and variations will now be apparent to those skilled in the art. Accordingly, the present invention is intended to embrace all such alternatives, modifications and variations and fall within the spirit and scope of the appended claims. Moreover, the description and illustration of the invention is by way of example, and the scope of the invention is not limited to the exact details shown or described as well as the order of structure, the values, angles, directions of focusing beams.

What is claimed is:

1. A rewritable optical recording medium with an ZnO near-field optical interaction layer for discs comprising:

a) a transparent substrate;

b) a first transparent dielectric thin film layer formed on the transparent substrate;

c) a zinc-oxide nano-structured thin film layer formed on the first transparent dielectric thin film layer and selectively causing a localized near-field optical effect;

d) a second transparent dielectric thin film layer formed on the zinc-oxide nano-structured thin film layer;

e) a rewritable recording thin film layer formed on the second transparent dielectric thin film layer; and f) a third transparent dielectric thin film layer formed on the rewritable recording thin film layer, wherein the first transparent dielectric thin film layer and the zinc-oxide nano-structured thin film layer are located between the transparent substrate and the rewritable recording thin film layer.

2. The rewritable optical recording medium with ZnO near-field optical interaction layer of claim 1, wherein said transparent substrate is made of $SiO_2$ glass materials or doped $SiO_2$ glass materials containing materials selected from Sodium (Na), Lithium(Li), Calcium(Ca), Potassium (K), Aluminum(Al), Germanium(Ge), and Boron (B).

3. The rewritable optical recording medium with ZnO near-field optical interaction layer of claim 1, wherein said transparent substrate is made of the transparent polymerized materials which comprise one of polycarbonate, and epoxy resin.

4. The rewritable optical recording medium with ZnO near-field optical interaction layer of claim 1, wherein said first transparent dielectric thin film layer, said second transparent dielectric thin film layer and said third transparent dielectric thin film layer are selected from a group of the transparent dielectric materials consisting of ZnS—$SiO_x$, $SiO_x$, and $SiN_x$.

5. The rewritable optical recording medium with ZnO near-field optical interaction layer of claim 4, wherein said first transparent dielectric thin film layer, said second transparent dielectric thin film layer and said third transparent dielectric thin film layer are one of a single and a multiple layer structure.

6. The rewritable optical recording medium with ZnO near-field optical interaction layer of claim 4, wherein the optimal thickness of the first transparent dielectric thin film layer is in a range between 50 nm and 300 nm.

7. The rewritable optical recording medium with ZnO near-field optical interaction layer of claim 4, wherein the optimal thickness of the second transparent dielectric thin film layer is in a range between 5 nm and 100 nm.

8. The rewritable optical recording medium with ZnO near-field optical interaction layer of claim 4, wherein the optimal thickness of the third transparent dielectric thin film layer is in a range between 5 nm and 100 nm.

9. The rewritable optical recording medium with ZnO near-field optical interaction layer of claim 1, wherein said first transparent dielectric thin film layer, said second transparent dielectric thin film layer and said third transparent dielectric thin film layer are one of a single and a multiple layer structure.

10. The rewritable optical recording medium with ZnO near-field optical interaction layer of claim 1, wherein the optimal thickness of the first transparent dielectric thin film layer is in a range between 50 nm and 300 nm.

11. The rewritable optical recording medium with ZnO near-field optical interaction layer of claim 1, wherein the optimal thickness of the second transparent dielectric thin film layer is in a range between 5 nm and 100 nm.

12. The rewritable optical recording medium with ZnO near-field optical interaction layer of claim 1, wherein the optimal thickness of the third transparent dielectric thin film layer is in a range between 5 nm and 100 nm.

13. The rewritable optical recording medium with ZnO near-field optical interaction layer of claim 1, wherein said zinc-oxide (ZnO) nano-structured thin film layer that is capable of causing localized near-field optical effect is made of one of a compound of zinc-oxide and compositions of zinc-oxide and zinc.

14. The rewritable optical recording medium with ZnO near-field optical interaction layer of claim 13, wherein the optimal thickness of said zinc-oxide (ZnO) nano-structured thin film layer that is capable of causing localized near-field optical effect is in a range between 5 nm to 100 nm.

15. The rewritable optical recording medium with ZnO near-field optical interaction layer of claim 1, wherein the optimal thickness of said zinc-oxide (ZnO) nano-structured thin film layer that is capable of causing localized near-field optical effect is in a range between 5 nm to 100 nm.

16. The rewritable optical recording medium with ZnO near-field optical interaction layer of claim 1, wherein said rewritable recording thin-film layer is selected from a group of photo-thermal effect and magneto-optical effect materials consisting of $Ge_xSb_xTe_x$, $In_xSb_yTe_z$, $Ag_wIn_xSb_yTe_z$, $Fe_xTb_yCo_z$, $Gd_x$ $Tb_yFe_z$ and $Co_xPt_y$, wherein the materials are doped with elements selected from a group consisting of Copper(Cu), Zinc(Zn), Arsenic(As), Tin(Sn), Gold(Au), Mercury(Hg), Thallium(Tl), Lead(Pb), Bismuth(Bi), Gallium(Ga), Germanium(Ge), Cadmium(Cd), Indium(In), Antimony(Sb), Silver(Ag), Selenium(Se), and Tellurium (Te).

17. The rewritable optical recording medium with ZnO near-field optical interaction layer of claim 16, wherein said rewritable recording thin-film layer is one of a single and a multiple layer structure.

18. The rewritable optical recording medium with ZnO near-field optical interaction layer of claim 16, wherein the optimal thickness of said rewritable recording thin film layer is in a range of between 5 nm and 100 nm.

19. The rewritable optical recording medium with ZnO near-field optical interaction layer of claim 1, wherein said rewritable recording thin-film layer is one of a single and a multiple layer structure.

20. The rewritable optical recording medium with ZnO near-field optical interaction layer of claim 1, wherein the optimal thickness of said rewritable recording thin film layer is in a range between 5 nm and 100 nm.

* * * * *